UNITED STATES PATENT OFFICE.

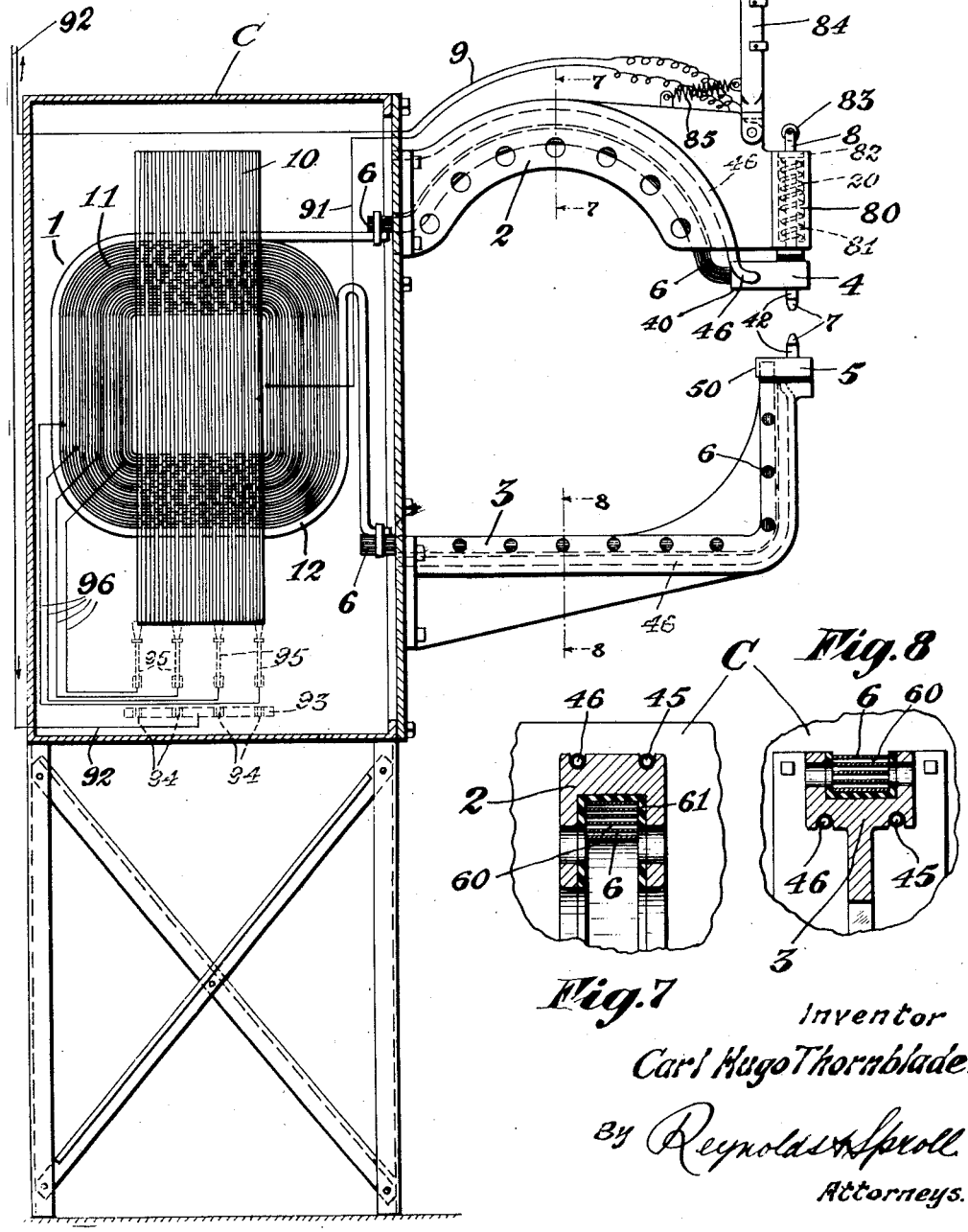

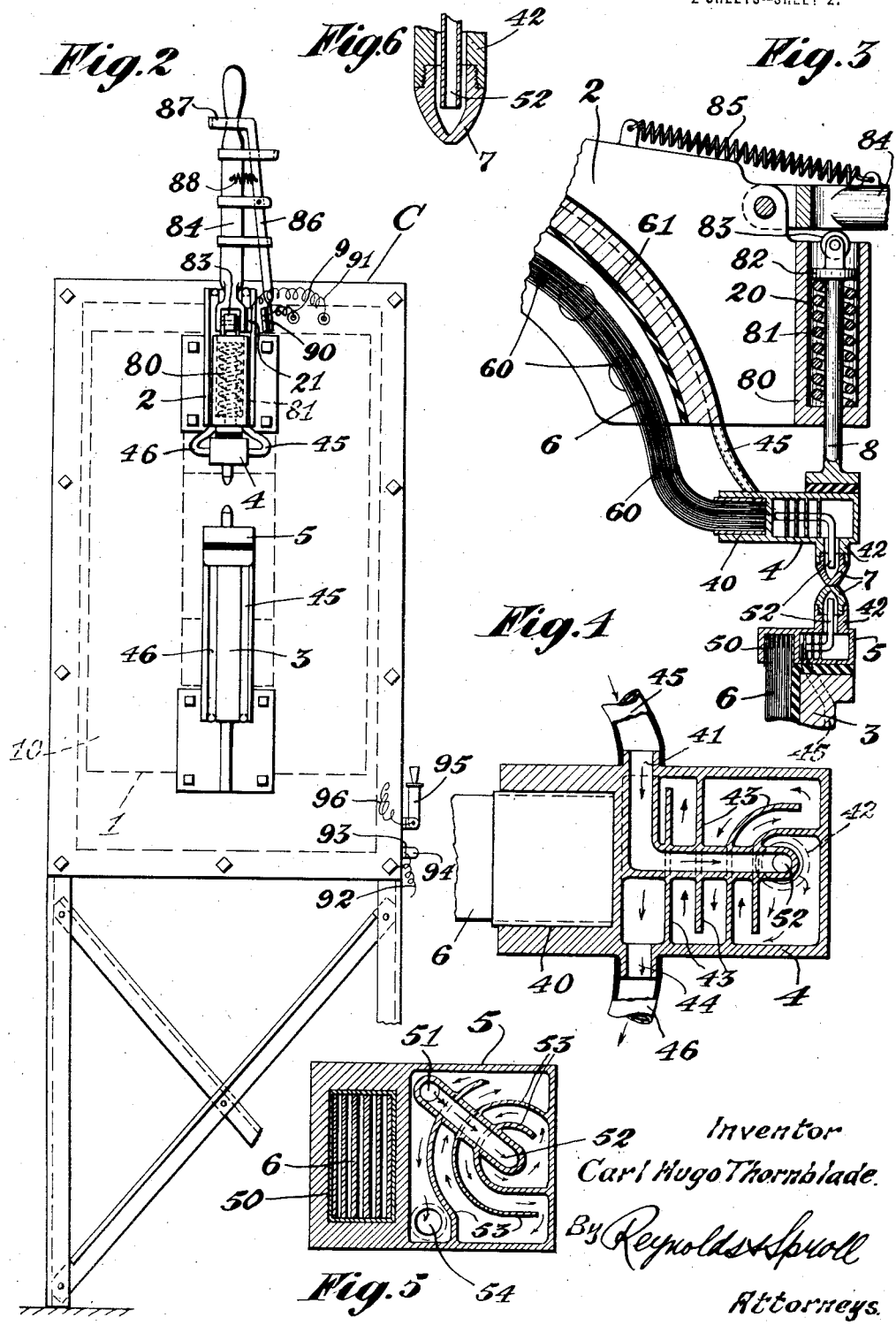

CARL HUGO THORNBLADE, OF SEATTLE, WASHINGTON, ASSIGNOR TO PACIFIC ELECTRIC WELDER AND MANUFACTURING COMPANY, OF SEATTLE, WASHINGTON, A CORPORATION OF WASHINGTON.

ELECTRIC WELDER.

1,196,904.     Specification of Letters Patent.     Patented Sept. 5, 1916.

Application filed December 20, 1915. Serial No. 67,932.

*To all whom it may concern:*

Be it known that I, CARL HUGO THORNBLADE, a citizen of the United States, and resident of the city of Seattle, county of King, State of Washington, have invented certain new and useful Improvements in Electric Welders, of which the following is a specification.

My invention relates to electric welders, and comprises certain features of improvement therein, which will be hereinafter described and then particularly pointed out in the claims.

The object of my invention is to improve the general construction of devices of this sort, increase its efficiency and convenience, and to inclose the conductors so as to avoid the possibility of accidental contact with the conductors in a manner as to produce any danger or do any damage.

In the accompanying drawings I have shown my invention embodied in the type of construction which is now preferred by me.

Figure 1 is a side elevation of the welding machine, the case which contains the transformer is shown in section. Fig. 2 is a front elevation of the same machine. Fig. 3 is a vertical section through the outer ends of the welding electrodes and the supports and connections therefor. Fig. 4 is a horizontal section through the upper of the electrode carrying members. Fig. 5 is a horizontal section through the lower of the electrode carrying members. Fig. 6 is an axial section on a larger scale through one of the electrodes. Figs. 7 and 8 are sections respectively on the lines 7—7 and 8—8 of Fig. 1.

This welder is of a type known as the Thomson welder, that is it depends upon the electric resistance of the parts being welded being sufficiently great for the amperage of the current employed that the material will be heated to a welding temperature; or to state it differently, the amperage of current employed is sufficient by the resistance of the parts being welded to raise them to a welding temperature.

The transformer 1, may be of any suitable type of construction which is adapted to produce a current having a high amperage and low voltage. As herein shown it consists of a core or pole pieces 10, which are of laminated construction, primary coils 11, and secondary 12, which consists of a copper bar of considerable cross section which extends about the coils 11.

From one side of the case C, which incloses the transformer, or from any other suitable support, extends two arms, 2 and 3, these being of a shape and size as are best adapted for handling the type of work for which the machine is intended. Upon the outer ends of these arms are mounted the electrodes, one of these electrodes as the lowermost is fixed in position. Each of these electrodes is mounted upon a base member 4 and 5, each of which is hollow and is provided with means for the internal secretion of a cooling fluid, as water.

The base 5 is mounted upon the lower arm 3, and is shown in section in Fig. 5. This has a socket 50 for the reception of the current carrying lead 6. It also has provision for the connecting thread of two tubes through which the cooling fluid is supplied and carried away. The supply connection is at 51, and is with a conduit which is formed within the tube, which conduit extends to the axis of the electrode and thence upwardly terminating in a pipe 52, which extends into the axial hollow or bore of the electrode. This pipe is of smaller size than said bore so that the water when discharged may have a rapid flow channel outside the pipe 52 into the hollow in the base 5. This base is provided with a series of partitions 53, which cause the water to flow through a circuitous channel to the outlet 54.

It is of course evident that the direction of flow might be made opposite to that just described, although such is not the preferred condition.

The upper electrode is carried upon a base 4, which is of a construction essentially like that just described in principle. It has a socket 40 for the reception of the upper current carrying lead 6, and conduit or tubular passage connecting the inflow channel 41 with a pipe 52, which extends inward into the hollow bore of the electrode. The base 4 is also provided with partitions 43, which compel the water to flow in a circuitous path to the outlet 44. A supply pipe 45 and a discharge pipe 46 of flexible material, as rubber, are connected with the upper electrode base 4, and carry the water to and from the same.

The upper electrode base 4 is provided with a projecting nipple 42, and the lower base with a like projecting nipple 42, which are screw threaded for the attachment of the electrodes 7. The latter have an axial bore, which extends close to the tip which connects with the material being welded. The shape of the connecting surfaces of these electrodes would vary in accordance with the character of the welding operation being performed. I have herein shown them as having a circular face, this would vary in accordance with the requirements of the work.

The upper electrode base 4 is mounted upon a rod 8, which is mounted to reciprocate vertically in suitable guides 80, carried by the outer end of the supporting arm 2. This arm has a chamber 20 within which is placed a helical spring 81, and the bar 8 has a head 82, which partakes of the nature of a piston, which fits and slides within the bore or cylinder 20. The upper extension of the rod 8 is preferably provided with a friction roller 83, which is adapted to be engaged by the operating lever 84. The spring 81 serves to normally maintain the electrodes out of contact, and the lever 84 to force the electrodes into contact when it is drawn down. The lever 84 is normally held raised and the electrodes out of contact by means of a spring 85.

One of the primary conductors 9 leading to the transformer is connected at the point 90 with a contact member mounted and insulated from the end of a lever 86, which is pivoted upon the lever 84. The arm 2 is provided with a combination contact member 21 adapted to be engaged thereby when the lever 86 is swung to carry its electrical connected member 90 thereto. The member 21 is connected by a lead 91 with one end of the primary of the transformer coil.

Lever 86 has one end 87 extended to a point where it is conveniently engaged by the hand at the same time the lever 84 is engaged to be depressed. This way the lever 86 is operated so as to throw the primary current upon the transformer where the employed electrode is adapted to effect a welding operation.

A spring 88 acts to separate the contact members 90 and 21 as soon as they are released. The lead 92 which represents the outer side of the primary current conductor is carried to a connection with a bus-bar 93, which is provided with a series of switch contacting members 94. A corresponding number of switch bars 95 are provided, one for each of the contacting members 94 carried by the bus-bar and leads 96 extend from each of these switch bars to a connection with the primary coils of the transformer; each of these leads 96 connects at a different resistance from the connection of the opposite lead 91. The lead is connected with one end of the primary coil and one of the leads 96 is connected with the opposite end of the primary coil, while the remainder of the leads 96 are connected at different intermediate points. In this way by selecting the switch bar 95 which is to be employed the compression of the current generated may be controlled, thereby regulating the heat developed to correspond with the area of the material to be mended and the size of the weld. These switch bars may be connected up in any combination desired, thereby making possible a wide adjustment and regulation of the current employed.

The current is conveyed from the secondary 12 of the transformer to the electrodes through laminated conductors 6. These consist of strips of thin copper plate, which are primarily maintained slightly spaced from each other by the usage of spacers 60 at intervals along their length. This provides a free circulation of air between the lengths and therefore assists in maintaining them cool.

Each of the arms 2 and 3 is provided with a channel of a size to receive the conductors 6. This channel is provided with an insulated lining 61, so as to keep the current insulated from the arms 2 and 3. These channels are preferably placed on the inner side of the arms, that is on the under side of the upper arm and the upper side of the under arm. The insulation may be placed to cover the inner sides of the conductors if desired. Being embodied in the arm in this manner there is very little danger of contact with the apparatus being operated upon. Each of these arms is also provided with a pair of channels for the reception of the water conducting pipes 45 and 46. These channels are however, upon one side of the arm preferably the outer sides or that opposite the one which contains the channel for the conductor 6. In this way the tubes which convey the water to and from the electrodes are protected and are not liable to be damaged during the process of operating the machine.

What I claim as my invention is as follows:

1. In an electric welder an electrode carrying arm having a channeled cross-section, an insulating lining for said channel and current carrying leads lying within said channel.

2. In an electric welder an electrode carrying arm having a channel in one side provided with an insulated lining, a current conductor lying in said channel, said arm also having a pair of channels in the side opposite the first named channel and water conducting tubes in said pair of channels.

3. An electrode carrying arm for electric welders having a lead carrying channel on one side provided with an insulating lining and a pair of channels for the reception of tubes for the cooling water.

4. An electrode base for electric welders comprising a hollow casing having water supply and discharge connections and an opening for the attachment of the electrode, said base having partitions forming a circuitous passage between the point of attachment of the electrode and the water discharge connection and a tubular conduit extending from the water supply connection to the point of attachment of the electrode.

Signed at Seattle, Washington, this 13th day of December, 1915.

CARL HUGO THORNBLADE.